G. D. POGUE.
LUBRICATING SYSTEM FOR MACHINE BEARINGS.
APPLICATION FILED FEB. 11, 1916.
1,289,903.
Patented Dec. 31, 1918.
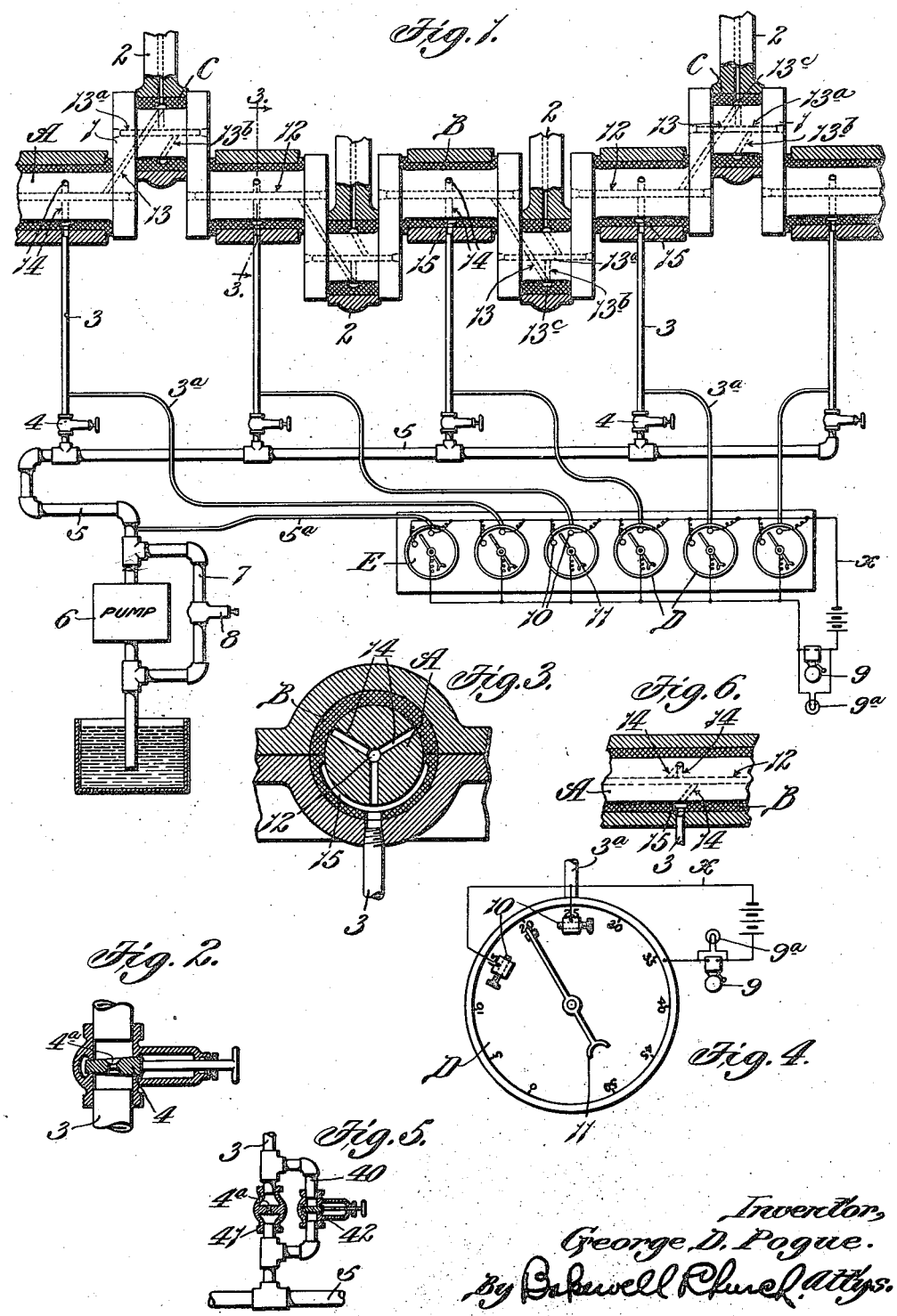
Inventor,
George D. Pogue.
By Bakewell Church, Attys.

UNITED STATES PATENT OFFICE.

GEORGE D. POGUE, OF ST. LOUIS, MISSOURI.

LUBRICATING SYSTEM FOR MACHINE-BEARINGS.

1,289,903.  Specification of Letters Patent.  Patented Dec. 31, 1918.

Application filed February 11, 1916. Serial No. 77,627.

*To all whom it may concern:*

Be it known that I, GEORGE D. POGUE, a citizen of the United States, residing at St. Louis, Missouri, have invented a certain new and useful Improvement in Lubricating Systems for Machine-Bearings, of which the following is a full, clear, and exact description, such as will enable others skilled in the art to which it appertains to make and use the same.

This invention relates to lubricating systems for oil engines and various other kinds of machines in which lubricating oil is supplied under pressure to certain bearings or parts of the machine when the engine or machine is in operation.

One object of my present invention is to provide a continuous supply of lubricating oil for the main bearings of an engine at sufficient pressure to insure its delivery through passages in the crank shaft, crank and connecting rod, to the crank pin and piston or cross-head pin.

Another object is to provide a simple means for determining the rate of flow through each of several separate and distinct oil ducts or conduits which lead to the stationary main bearings of the machine, even if the several ducts are supplied through a single supply line.

Another object is to provide a method of drilling the transverse holes in the main journals and the crank pin so that the shaft will not be unduly weakened, even if a plurality of such holes is employed.

Another object is to provide a lubricating system of the kind just referred to that comprises one or more signals which operate automatically whenever the pressure or rate of flow in any of the said oil ducts or conduits varies from certain predetermined limits, thus notifying the operator in charge of the machine that the lubricating system needs attention.

Another object is to provide a lubricating system for engines and other kinds of machines which is so constructed that the supply of oil to a certain bearing or part of the machine can be increased quickly without increasing or diminishing the supply of oil to the other bearings or parts of the machine that are being lubricated.

Another object is to provide a lubricating system for crank pin bearings which is so designed that lubricating oil will be supplied to the crank pin bearings continually when the system is in operation, instead of only intermittently, as in the lubricating systems now in general use.

I have herein illustrated my invention embodied in a system that is used for lubricating the main bearings and the crank pin of an oil engine, but I wish it to be understood that my invention is not limited to a lubricating system for oil engines or to a system that is used for lubricating the main bearings and crank pin bearings of an engine or machine, as my broad idea is applicable to any kind of a lubricating system in which a plurality of separate and distinct ducts or conduits lead from a supply of oil under pressure.

Figure 1 of the drawings is a view illustrating my improved lubricating system used in connection with an oil engine for supplying lubricating oil to the main bearings and to the crank pin bearings of the engine.

Fig. 2 is an enlarged sectional view of one of the gate valves which is provided with a carefully calibrated orifice.

Fig. 3 is an enlarged cross-sectional view of the crank shaft and one of the main bearings, taken on the line 3—3 of Fig. 1.

Fig. 4 is an enlarged front elevational view of one of the pressure gages and the audible and visible signals controlled by same; and Figs. 5 and 6 are views illustrating slight modifications of my invention.

Referring to the drawings, which illustrate the preferred form of my invention, A designates a crank shaft provided with cranks 1 to which connecting rods 2 are joined, and B and C, respectively, designate the main bearings and the crank pin bearings. Separate and distinct oil ducts or conduits 3 that communicate with a supply of oil under pressure lead to the various main bearings B, as shown in Fig. 1, each of said supply ducts being equipped with a valve 4 that is adapted to be opened whenever it is desired to increase the supply of oil to the bearing with which the duct 3 coöperates. The valves 4 that I prefer to use are of the type that are generally known as "gate" valves, and each valve is provided with a carefully calibrated orifice 4ª, as shown in Fig. 2, whose diameter is sufficiently less than the internal diameter of the oil conduit 3 to restrict the flow of the oil through said conduit when the valve 4 is closed. The orifice 4ª in each of the valves 4 is so proportioned that the proper quantity of oil will pass the valve when the valve is closed and when the source of supply of oil is under a certain pressure. The valves 4 are normally closed, but if it becomes necessary or desirable to increase the supply of oil to any one of the various main bearings, this can be accomplished quickly by opening the valve 4 in the oil duct 3 that leads to said bearing. In the form of my invention herein illustrated the oil ducts 3 branch laterally from an oil supply pipe 5 through which oil is forced by means of a pump 6, or other suitable device, that will maintain a certain predetermined pressure in the oil pipe 5, the pump 6 being provided with a by-pass 7 and a relief valve 8, so as to prevent the pressure in the supply pipe 5 from rising above a certain degree when the engine is in operation.

In order that the operator in charge of the engine will know, at all times, whether or not each main bearing is receiving the proper amount of oil, I have provided a pressure gage D for each of the main bearings B, which pressure gages are connected by means of pipes 3ª with the oil ducts 3, so as to show the pressure that exists in each of the oil ducts 3 that lead to the main bearings B. I also prefer to use a pressure gage E for showing the pressure that exists in the pipe 5 through which the oil is supplied to the various branch ducts 3, the pressure gage E being connected with the supply pipe 5 by means of a small pipe 5ª that is tapped into the pipe 5 at a point between the upper end of the by-pass 7 and the first branch duct 3 that leads from the supply pipe 5. The pressure gage pipes 3ª are tapped into the oil conduits 3 at points between the valves 4 in said conduits and the main bearings to which said conduits lead, as shown in Fig. 1. If desired, a signal can be combined with the pressure gages in such a manner that it will operate automatically whenever the pressure in the supply pipe 5 or in one of the branch ducts 3 varies from certain predetermined limits, it being practicable to use either an audible signal or a visible signal, or both types of signals may be used. One way of accomplishing this is illustrated in Fig. 1, wherein the reference character 9 designates an audible signal, such, for example, as a bell that is arranged in an electric circuit $x$, and 9ª designates a visible signal that is arranged in said circuit. Each of the gages D and E is provided with a pair of contacts 10 that are electrically connected to one side of the circuit $x$, and the hand or indicator 11 of each of said gages is formed of metal and is electrically connected to the other side of the circuit $x$. The contacts 10 of each gage are arranged on the dial of the gage in proximity to the numerals on the dial that represent the limits within which the pressure ought to be held. Consequently, whenever the hand 11 of the gage moves to the right or left far enough to engage one or the other of the contacts 10, the signal, or signals, if two are employed, will operate automatically, and thus notify the operator in charge of the engine that the lubricating system is not operating normally. By looking at the gages the operator can tell at a glance whether the pressure in the supply pipe is too high or too low, or whether any individual bearing of the engine is receiving too much oil or not enough oil. The object of the orifice 4ª in each of the gate valves 4 is to produce a measurable "drop" in the line pressure. The diameter of this orifice can best be determined by experiment with the particular class of lubricating oil most suitable for the purpose, the orifice being proportioned to give the desired drop in pressure when the desired quantity of lubricating oil flows or is forced through it. For example, if the pressure in the main supply pipe were twenty-five pounds gage, and, with normal quantity flowing to bearings, the drop through orifice were ten pounds gage, then the normal pressure in the branch line should be fifteen pounds gage. If a stoppage occurs in the branch line or in the oil ducts in the crank shaft, then the pressure on the corresponding gage would rise to twenty-five pounds, or on a partial stoppage, to some pressure between fifteen and twenty-five pounds gage.

On the other hand, if sufficient wear occurs in any bearing to allow an abnormally large quantity of oil to flow through that particular branch line, then the pressure will drop, and thus indicate to the attendant the necessity of taking up the main crank or piston pin bearing or bearings in that particular group.

From the above it will be seen that a single gage D performs the two-fold purpose of indicating to the attendant any departure from normal pressure or rate of flow. While I have illustrated one method of maintaining uniform pressure in the main supply line, I do not restrict myself to this particular method, as there are various other methods which could be employed, and as far as the signal is concerned, this could be omitted entirely or a different signal or different types of signals employed. For instance, in a power station, where other noises might interfere with the use of an audible signal, it might be desirable to use incandescent lamps which would be switched on by the movement of the gage needle to a position indicating abnormal pressure, or rate of flow. The arrangement of the orifice in the gate valve possesses the additional advantage that the orifice may be readily removed from the line for inspection or another orifice, larger or smaller, may be readily substituted, all without breaking any pipe connections. Instead of equipping the ducts 3 with gate valves provided with orifices, as shown in Fig. 2, each of said ducts can be provided with a by-pass 40 that extends around a stationary partition 41 in the duct which is provided with an orifice 4ª, as shown in Fig. 5, the by-pass having a valve 42 that is normally closed, but which is adapted to be opened for the same purpose that the gate valves are opened.

The crank pin bearings C receive their supply of oil from distributing ducts 12 and 13 that are formed in the crank shaft A, and in the cranks 1, as shown in broken lines in Fig. 1, the distributing ducts 12 extending longitudinally through the portions of the crank shaft that are surrounded by the main bearings B and the ducts 13 leading from the ducts 12 to center ducts 13ª in the crank pins which are provided with branching ducts or oil holes 13ᵇ that communicate with oil grooves 13ᶜ in the inner sides of the crank pin bearings C. Each of the distributing ducts 12 is provided with three or more branch ducts or oil holes 14 that project outwardly therefrom and terminate in the outer surface of the portion of the crank shaft in which the distributing duct 12 is formed, and each of the main bearings B is provided in its lower half with a semi-circular-shaped groove 15 that communicates with the supply conduit 3 that coöperates with said bearing, as shown in Fig. 3. The semi-circular-shaped groove 15 in the main bearing is long enough so that one or the other of the distributing ducts 14 will always be in communication with said groove 15, thus preventing the supply of oil to the distributing duct 12 from being interrupted intermittently, as would result if the crank shaft was provided with only a single radially-disposed distributing duct 14. By providing the crank shaft with distributing ducts arranged in the manner illustrated in Fig. 3 and providing the main bearings with relatively long, semi-circular-shaped grooves 15 I obtain a continual supply of oil to the connecting rod bearings. In practice the oil holes or branch ducts in the crank shaft and in the crank pins that branch laterally from the oil ducts as the centers of said members, are drilled at different angles, as shown in Fig. 6, or, in other words, obliquely to a plane lying at right angles to the axes of the shaft or pins, so as to avoid weakening the crank shaft and crank pins.

In a lubricating system of the construction above described the operator in charge of the engine or machine in which the system is used can ascertain quickly whether or not the various bearings or parts of the machine are being properly lubricated, and if the system is not operating normally, he knows just which bearing of the machine is receiving too much oil or not enough oil. If one of the branch ducts 3 that lead from the source of supply becomes clogged, the obstruction can generally be dislodged by simply opening the gate valve of the obstructed conduit 3, so as to increase the flow of oil through said conduit. A lubricating system of the construction above described can not only be controlled easily and accurately, but it tends to reduce damage to the bearings occasioned by a careless or inattentive operator, owing to the fact that it comprises a signal which operates automatically whenever one or the other of the bearings of the machine is receiving too much oil or not enough oil. In addition to the desirable features above mentioned, such a lubricating system also insures adequate lubrication of the crank pin bearings, by reason of the fact that the distributing ducts in the crank shaft and in the cranks are so constructed and arranged that oil will be supplied to the crank pin bearings continually when the system is in operation.

Having thus described my invention, what I claim, and desire to secure by Letters Patent, is:

1. A lubricating system for engines and machines, comprising a conduit through which oil from a supply of oil under pressure flows, a branch duct leading from said conduit, a valve in said branch duct having an orifice therein which is of such diameter that it will pass a normal supply of oil with a resulting normal drop in pressure across said orifice, and pressure-operated devices combined with said conduit and with said branch duct in such a manner that the attendant in charge of the engine or machine can readily determine both the pressure and the rate of flow that exists in said branch duct.

2. A lubricating system for engines and machines, comprising a main supply line through which oil flows, means for maintaining constant pressure therein, a plurality of branch lines communicating with said main supply line, a valve in each branch line having a fixed orifice therein which is of such diameter that it will pass a normal supply of oil with a resulting normal drop in pressure across said orifice, and gages combined with said supply line and said branch lines in such a manner that the attendant in charge of the engine or machine can readily determine both the pressure and rate of flow that exists in any of said branch lines.

In testimony whereof I hereunto affix my signature in the presence of two witnesses, this seventh day of February, 1916.

GEORGE D. POGUE.

Witnesses:
  WELLS L. CHURCH,
  GEORGE B. BAKEWELL.